(No Model.) 2 Sheets—Sheet 1.

A. BELL.
Apparatus for Medicating Air.

No. 237,468. Patented Feb. 8, 1881.

WITNESSES
W. Colborne Brookes
Charles C. Stetson

INVENTOR
Anthony Bell
by his attorney
Thomas D. Stetson (No Model.) 2 Sheets—Sheet 2.

A. BELL.
Apparatus for Medicating Air.

No. 237,468. Patented Feb. 8, 1881.

WITNESSES
W. Colborne Brookes
Charles C. Stetson

INVENTOR
Anthony Bell
by his attorney
Thomas D. Stetson

UNITED STATES PATENT OFFICE.

ANTHONY BELL, OF NEWCASTLE-ON-TYNE, COUNTY OF NORTHUMBERLAND, GREAT BRITAIN.

APPARATUS FOR MEDICATING AIR.

SPECIFICATION forming part of Letters Patent No. 237,468, dated February 8, 1881.

Application filed March 17, 1880. (No model.) Patented in Great Britain November 27, 1879.

*To all whom it may concern:*

Be it known that I, ANTHONY BELL, of the town and county of Newcastle-on-Tyne, in the county of Northumberland, Kingdom of Great Britain and Ireland, have invented new and useful Apparatus for Charging Air with Medicaments and Disinfectants, of which the following is a specification.

My invention relates to a novel apparatus for treating and applying air for curative and other purposes. By means of this apparatus a current of air may be rendered antiseptic, (with or without previous warming,) charged with a dry medicament or medicaments in any suitable proportion, and administered to a patient; or the air rendered antiseptic, but not medicated, may be discharged into a room or apartment to render the atmosphere therein antiseptic for surgical or other purposes.

The apparatus consists, essentially, of a fan or blower, means for driving it, a diaphragm or screen, of gauze or its equivalent, for holding carbolic acid or other antiseptic, through which the fan or blower draws air in such manner as to render it antiseptic, and a pipe, tube, or channel, through which the air rendered antiseptic as aforesaid is forced by the fan or blower. To charge the air so treated with dry medicaments I combine with the above apparatus a hopper or vessel, arranged to contain the medicament or medicaments, and means for shaking said hopper or vessel or causing it to vibrate in such manner as to insure the discharge therefrom (into the pipe, tube, or channel through which the air, rendered antiseptic as aforesaid, passes from the pan or blower) of the requisite proportion of dry medicament.

The following is a description of what I consider the best means of carrying out the invention as applied for medical purposes.

Figure 1:
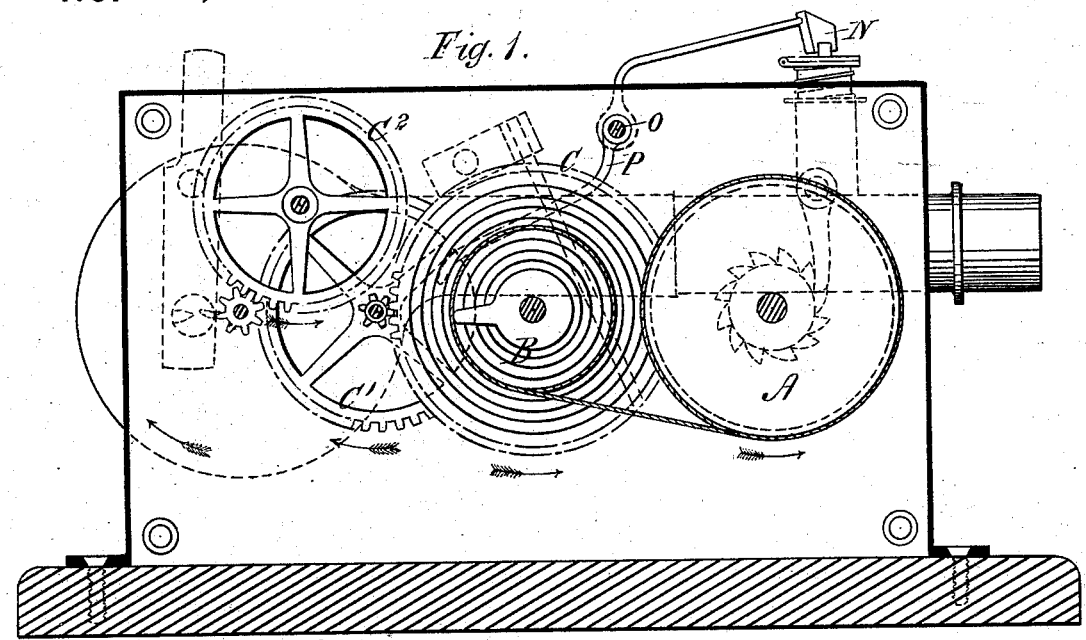
Figure 2:
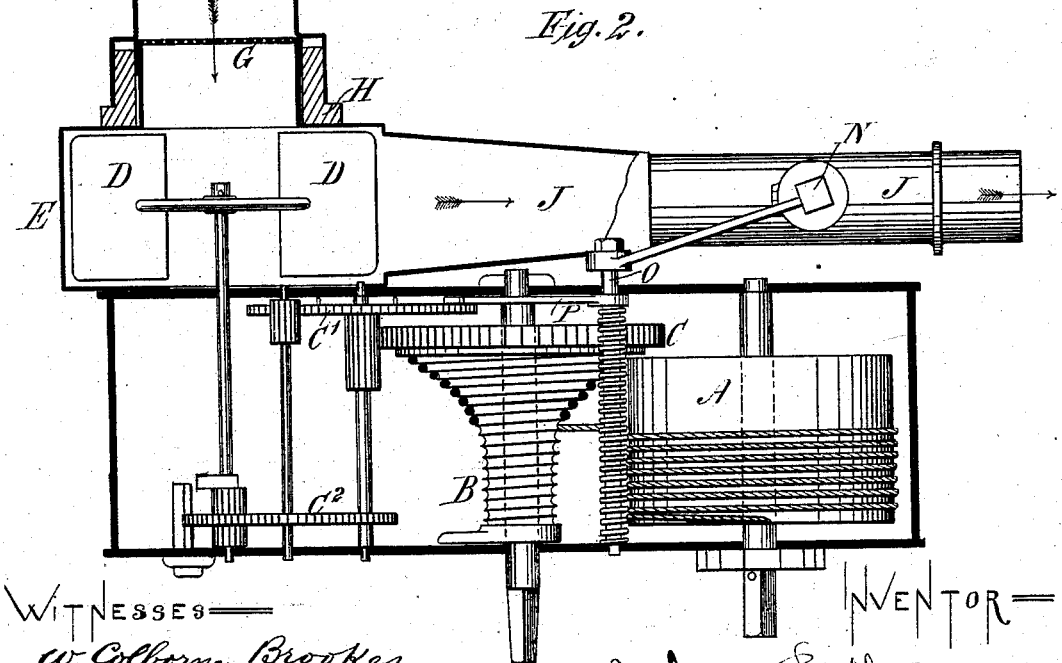
Figure 3:
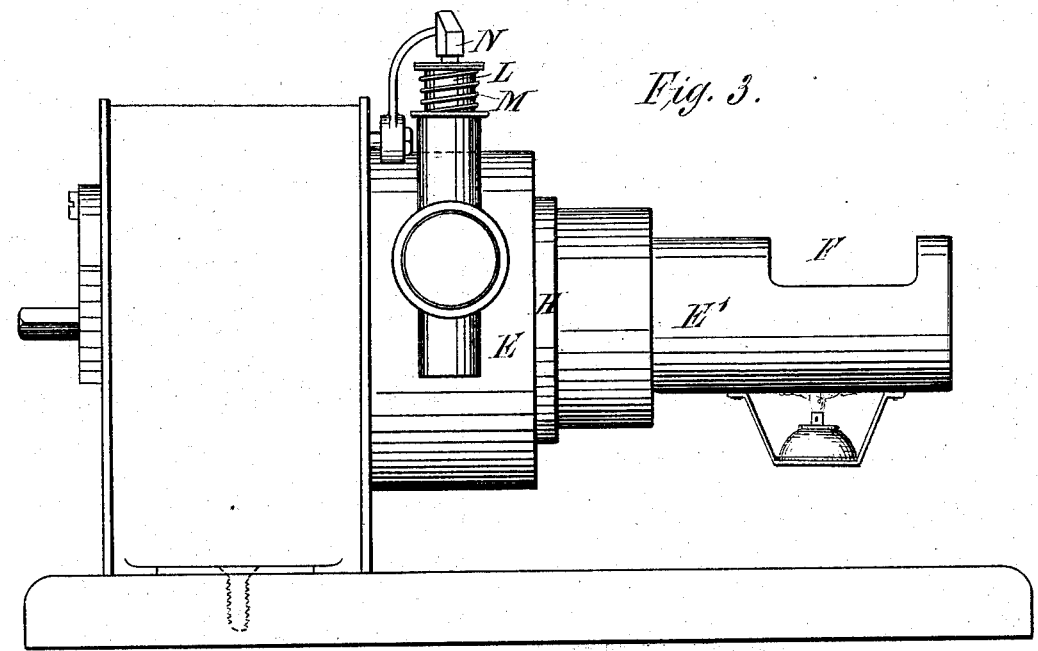
Figure 4:
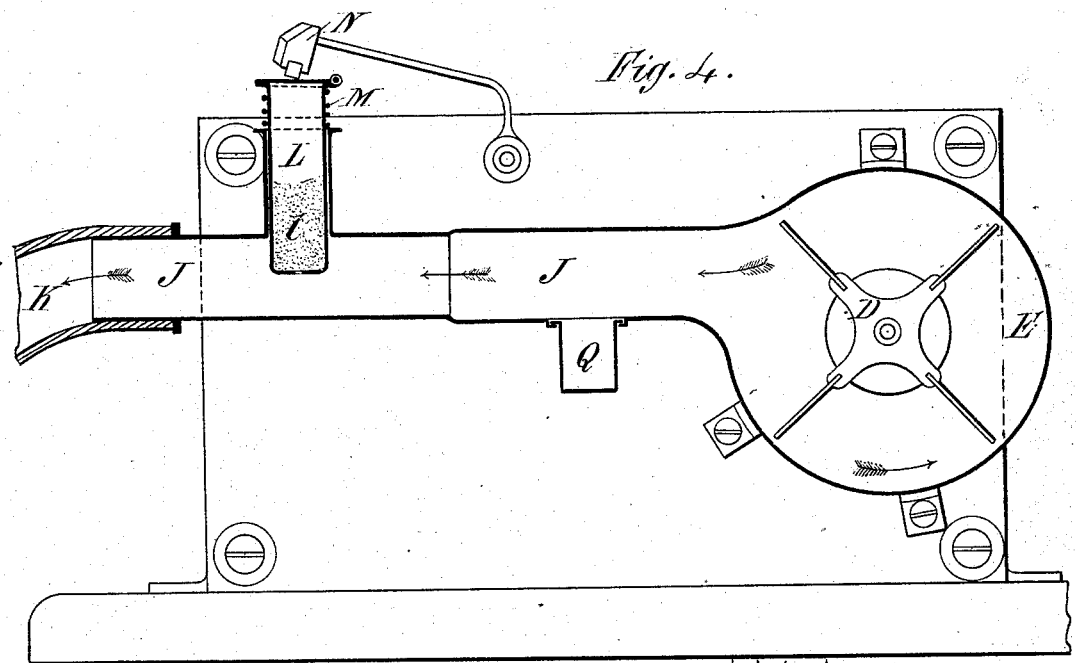

Referring to the accompanying drawings, Figure 1 is a sectional side elevation of the apparatus. Fig. 2 is a plan, also in section. Fig. 3 is an elevation or end view. Fig. 4 is a side elevation, in section, through the fan and air-delivery tube.

Similar letters of reference indicate corresponding parts in all the figures.

A is a drum containing a coiled spring, which, being wound up, gives motion, by a chain or wire cord, to the fusee B, and thence, by a train of toothed wheels and pinions, C, C', and $C^2$, to a small fan, D, inclosed in a case, E, having a pipe, E', projecting from it, with an inlet for the air at F. When required, the air is warmed as it enters, and this may be effected by means of a spirit-lamp placed underneath the inlet.

G is a diaphragm or screen of gauze, properly saturated with carbolic acid or other antiseptic to render the air passing through it antiseptic, and fixed to the inlet-branch of the fan-case by an ivory ring or cap, H, which intercepts the conduction of heat from E'.

The air drawn through the gauze by the fan D is forced along the delivery-pipe J (preferably of metal) into a flexible tube, K, fixed to the end of the pipe J, and terminating in a mouth-piece for the patient.

The dry medicament is contained in a hopper, L, which is closed by a lid at top, and at bottom is perforated with a small hole. This hopper is able to work freely in a case or guide formed upon the delivery-pipe J, being supported by a light spiral spring, M, upon which it rises and falls.

A small hammer, N, working upon a spindle, O, (having a spring, O', coiled upon it,) is caused to strike successive blows upon the lid of the hopper L, at regular intervals, by a tail-lever, P, on the spindle O, which is alternately pressed down and liberated by small studs $c'$ fixed in the rim of the spur-wheel C', the number of which studs determines or regulates the intervals between the blows of the hammer N. At each blow the hopper L is forced down upon the spring, and the concussion discharges a small quantity of the dry medicament $l$ through the hole in the bottom of the hopper into the center of the current of air passing along the pipe J from the fan D, and it is carried forward, mixed with the air, into the mouth of the patient.

When the air is required only to be rendered antiseptic the hopper L is not charged with medicament, or the instrument may for such purpose be constructed without the hopper L, hammer N, and its operating-gear, the operation of the fan-blast and other parts remaining the same.

Q is a small cup designed to contain chloroform, nitrate of amyl, or similar substances not required to be passed through the gauze in cases where such applications may be necessary.

What I claim is—

1. In an apparatus, as described, for supplying air in a medicated state to buildings, the combination of a fan, D, located directly in the line of draft, with a supply-pipe, E', provided with a saturated diaphragm, G, and a delivery-pipe, J, provided with means, L N, for supplying powder to the air, substantially as set forth.

2. In an apparatus for treating and applying air for curative and other purposes, the combination of a fan or blower, a supply-pipe provided with a diaphragm or screen of gauze, for holding carbolic acid or other antiseptic, a pipe through which air is to be forced by said fan, a hopper or vessel for containing and supplying dry powdered medicaments to a current of air flowing from the fan, and a hammer or striker for shaking said hopper or vessel, substantially as shown and described.

3. The combination of parts constituting the hereinabove-described apparatus for treating and applying air for curative and other purposes, and consisting of a fan or blower, D, mechanism, A B C C' C², for operating same, case E, pipe E', with inlet-pipe F, diaphragm or screen G, with ring or cup H, delivery-pipe J, hopper L, supported by spiral spring M, hammer N, working on spindle O, tail-lever P and means for operating same, cup Q, and flexible tube K, the whole constructed, arranged, and adapted to be operated substantially as and for the purpose specified.

ANTHONY BELL.

Witnesses:
  WM. BELL,
  *Harlow Hill, Northumberland, Land Agent.*
  WM. TAYLOR,
  *Eland Hall, Ponteland, Northumberland, Gentleman.*